(12) United States Patent
Ghabra et al.

(10) Patent No.: US 7,528,706 B2
(45) Date of Patent: May 5, 2009

(54) SYSTEM AND METHOD FOR TIRE PRESSURE MONITORING

(75) Inventors: Riad Ghabra, Dearborn Heights, MI (US); Tom Q. Tang, Novi, MI (US); John S. Nantz, Brighton, MI (US)

(73) Assignee: Lear Corporation, Southfield, MI (US)

( * ) Notice: Subject to any disclaimer, the term of this patent is extended or adjusted under 35 U.S.C. 154(b) by 264 days.

(21) Appl. No.: 11/458,212

(22) Filed: Jul. 18, 2006

(65) Prior Publication Data

US 2008/0018447 A1 Jan. 24, 2008

(51) Int. Cl.
*B60C 23/00* (2006.01)

(52) U.S. Cl. .................. 340/442; 340/447; 340/10.1; 73/146.2

(58) Field of Classification Search ......... 340/445–447, 340/142.2, 10.1, 10.5, 572.1–572.9; 73/142.2, 73/142.5, 146.2, 146.5
See application file for complete search history.

(56) References Cited

U.S. PATENT DOCUMENTS

| | | | | |
|---|---|---|---|---|
| 5,463,374 A | * | 10/1995 | Mendez et al. | 340/442 |
| 5,483,827 A | * | 1/1996 | Kulka et al. | 73/146.5 |
| 5,573,611 A | * | 11/1996 | Koch et al. | 152/152.1 |
| 5,602,524 A | * | 2/1997 | Mock et al. | 340/447 |
| 5,880,363 A | * | 3/1999 | Meyer et al. | 73/146.5 |
| 6,018,993 A | | 2/2000 | Normann et al. | |
| 6,181,241 B1 | | 1/2001 | Normann et al. | |
| 6,441,727 B1 | * | 8/2002 | LeMense | 340/442 |
| 6,448,891 B2 | * | 9/2002 | Barnett | 340/438 |
| 6,512,461 B1 | * | 1/2003 | Benzie et al. | 340/825.22 |
| 6,571,617 B2 | | 6/2003 | Van Niekerk et al. | |
| 7,088,226 B2 | * | 8/2006 | McClelland et al. | 340/442 |
| 2002/0084896 A1 | * | 7/2002 | Dixit et al. | 340/447 |
| 2002/0092345 A1 | | 7/2002 | Van Nickerk et al. | |
| 2002/0092346 A1 | | 7/2002 | Nickerk et al. | |
| 2002/0092347 A1 | | 7/2002 | Nickerk et al. | |
| 2004/0212487 A1 | * | 10/2004 | Yagi et al. | 340/445 |
| 2005/0104722 A1 | | 5/2005 | Tang et al. | |
| 2005/0134428 A1 | * | 6/2005 | Desai et al. | 340/5.61 |
| 2006/0017554 A1 | * | 1/2006 | Stewart et al. | 340/447 |

* cited by examiner

*Primary Examiner*—George A Bugg
*Assistant Examiner*—Edny Labbees
(74) *Attorney, Agent, or Firm*—Brooks Kushman P.C.

(57) ABSTRACT

A system and method for tire pressure monitoring. The system includes a receiver having a storage memory, and a transmitter corresponding to a tire. The storage memory includes a set of unique identifier. The transmitter includes a programmable memory. The receiver is configured to receive a signal, determine when the signal corresponds to a member of the set of unique identifiers, and process the signal when the signal corresponds to a member of the set of unique identifiers. The transmitter is configured to receive a unique member of the set of unique identifiers, store the unique member in the programmable memory, and transmit a signal corresponding to the unique member and the air pressure in the tire.

20 Claims, 3 Drawing Sheets

SYSTEM AND METHOD FOR TIRE PRESSURE MONITORING

BACKGROUND OF THE INVENTION

1. Field of the Invention

The present invention relates to a system and method for tire pressure monitoring.

2. Background

Conventional vehicle tire pressure monitoring systems generally comprise a plurality of transmitters. Each transmitter is generally associated with a tire of the vehicle and conveys a signal corresponding to the air pressure in the tire to a receiver mounted on the vehicle. In addition, each transmitter is generally pre-configured, for example during a manufacturing process, with a unique identifier that it attaches to the tire pressure signal. The unique identifier allows the receiver to associate a received signal with the transmitter that generated the signal. Accordingly, each transmitter must write (i.e., teach) its unique identifier to the receiver during a pairing (i.e., teaching) process.

Because such prior art tire pressure monitoring systems require each transmitter to write a unique identifier to the receiver, care must be taken during the manufacturing and/or pairing process to insure that transmitters pre-configured with identical identifiers are not implemented with the same receiver.

SUMMARY OF THE INVENTION

Accordingly, it may be desirable to have a system and method for tire pressure monitoring that may provide a reduction in cost and/or manufacturing complexity by reducing or eliminating the need to insure that only transmitters pre-configured with unique identifiers are implemented with a given receiver. Accordingly, one embodiment of the present invention may provide a reduction in cost and/or manufacturing complexity by providing for the receiver to assign unique identifiers to each transmitter associated with the receiver.

According to an embodiment of the present invention, a system is provided for monitoring air pressure in a tire of a vehicle. The system includes a receiver having a storage memory comprising a set of unique identifiers, and a transmitter corresponding to the tire and having a programmable memory. The receiver is configured to receive a signal, determine when the signal corresponds to a member of the set of unique identifiers, and process the signal when the signal corresponds to a member of the set of unique identifiers. The transmitter is configured to receive a unique member of the set of unique identifiers, store the unique member in the programmable memory, and transmit a signal corresponding to the unique member and the air pressure in the tire.

According to another embodiment of the present invention, a method is provided for monitoring air pressure in a tire of a vehicle. The method includes providing a transmitter having a programmable memory and a receiver configured to be coupled to the vehicle. The transmitter is configured to identify the air pressure of the tire. The receiver comprises a memory having a set of unique identifiers stored in the memory. The method further includes determining a unique identifier, using the receiver, from the set of unique identifiers stored in the memory of the receiver, writing the unique identifier to the programmable memory of the transmitter, and transmitting a signal, via the transmitter, to the receiver. The signal corresponds to the unique identifier and the air pressure in the tire.

According to yet another embodiment of the present invention, a method is provided for pairing a transmitter and a receiver in a system for monitoring air pressure in a tire of a vehicle. The method comprises determining, using the receiver, a unique identifier from a set of unique identifiers associated with the receiver, wherein the receiver is configured to store the set of unique identifiers in a memory; and writing the unique identifier to a programmable memory of the transmitter, wherein the transmitter is configured to transmit a signal to the receiver, the signal corresponding to the unique identifier and the air pressure in the tire.

DETAILED DESCRIPTION

Figure 1:
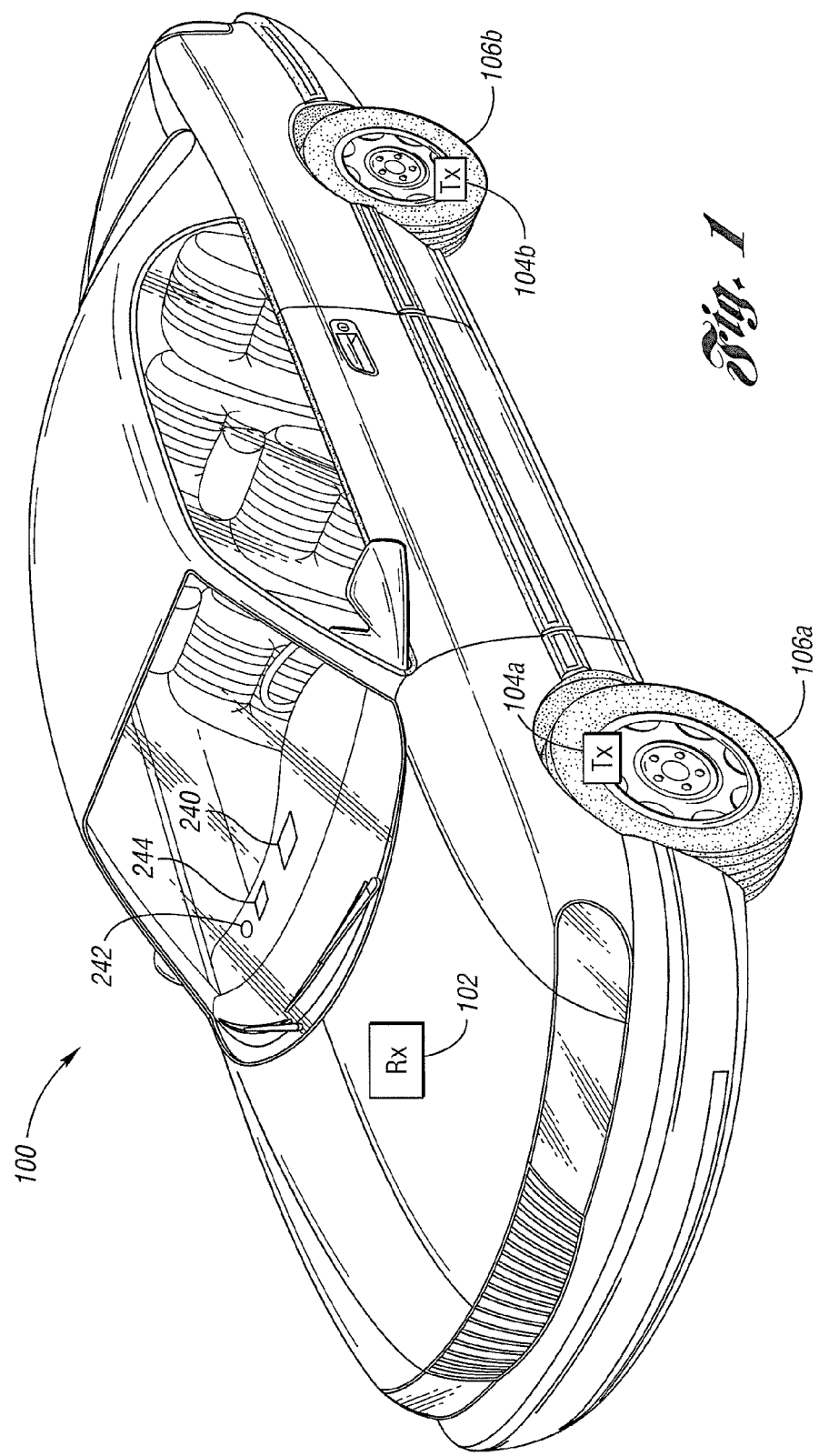
FIG. 1 is a schematic diagram illustrating an embodiment of the present invention implemented in connection with a vehicle.

Referring to FIG. 1, a schematic diagram is provided illustrating one embodiment of the present invention implemented in connection with a vehicle 100 (i.e., automobile, truck, etc.). As illustrated, the present invention generally comprises a receiver 102 in electronic communication (e.g., wireless communication) with one or more transmitters 104 (e.g., 104a, 104b, etc.). Each transmitter 104 generally corresponds to a tire 106 (e.g., 106a, 106b, etc.) of the vehicle 100 and is configured to transmit a signal corresponding to the air pressure in the corresponding tire 106.

In at least one embodiment, a single transmitter 104 may be implemented in connection with a single tire 106 of the vehicle 100, such as a spare tire (not shown). In at least one other embodiment, a plurality of transmitters 104 may be implemented such that one transmitter 104 corresponds to each tire 106 of the vehicle 100. However, any appropriate number of transmitters 104 may be implemented to meet the design criteria of a particular application.

Figure 2:
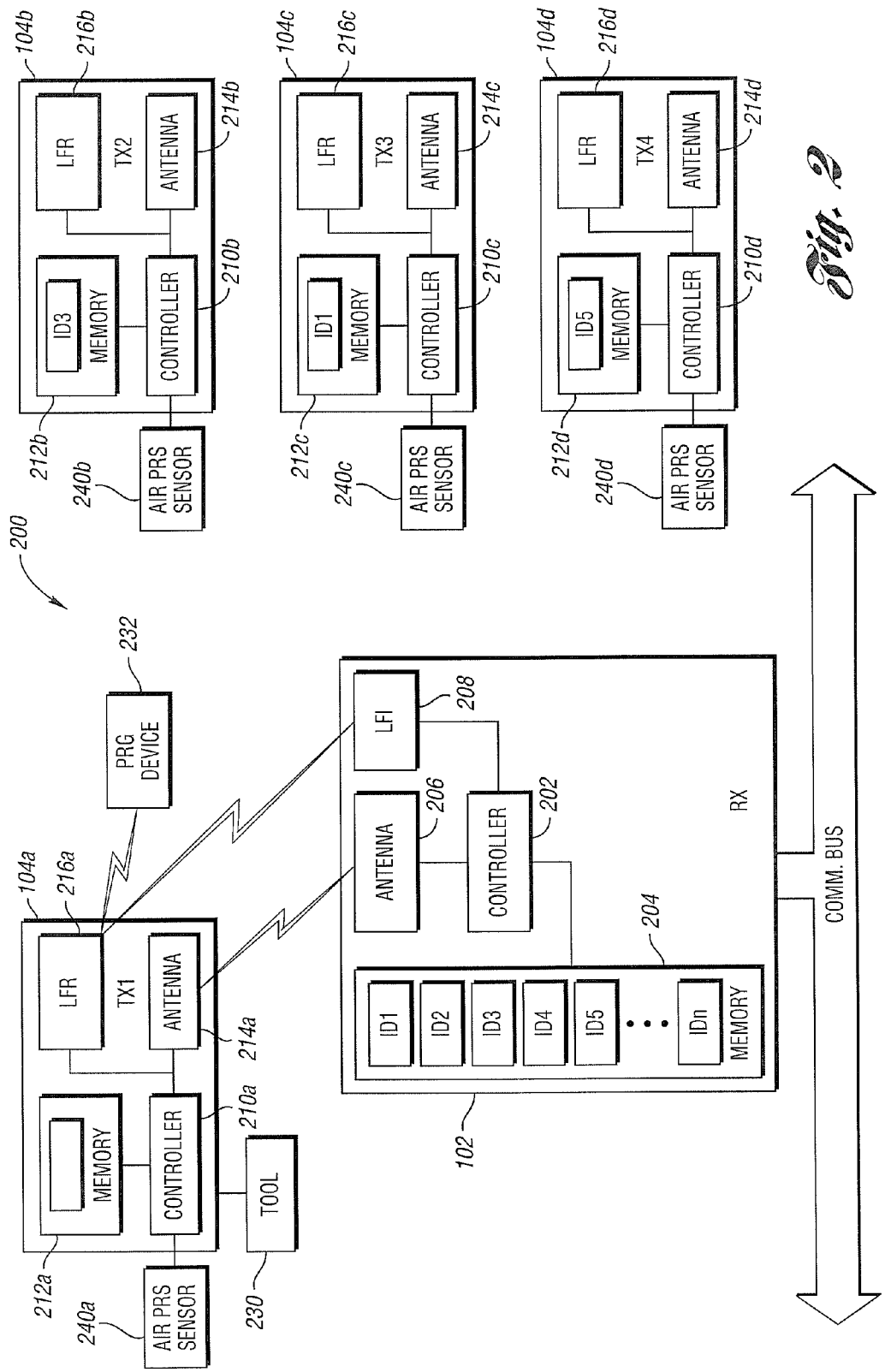
FIG. 2 is a system for monitoring air pressure in a tire of a vehicle according to an embodiment of the present invention.

Referring to FIG. 2, a system 200 is provided for monitoring air pressure in a tire 106 of a vehicle 100 according to an embodiment of the present invention. As previously illustrated in FIG. 1, the system 200 generally comprises a receiver 102 and one or more transmitters 104 (e.g., 104a-104d).

The receiver 102 generally comprises a controller (i.e., Rx controller) 202, a storage memory 204, and an antenna 206 for receiving/transmitting a signal from/to an antenna 214 of a transmitter 104. In at least one embodiment, the receiver 102 may optionally comprise a low frequency initiator (i.e., LFI) 208 for transmitting a signal to a low frequency receiver (i.e., LFR) 216 of the transmitter 104.

In general, the Rx controller 202 may be a computer or other electronic component (i.e., logical device) which executes a program and/or which performs other logical exercises, such as an application specific integrated circuit (i.e., ASIC) and/or the like. It is contemplated that all or part of the functionality of the components represented by the Rx controller 202 may be incorporated into a single controller, such as the Rx controller 202 illustrated in FIG. 2. Alternatively, the components and/or functionality represented by the Rx controller 202 may be distributed among a plurality of controllers (not shown). Controller inputs and outputs may be received and passed between controllers via a network, dedicated communication wires, and the like.

The storage memory 204 of the receiver 102 may be any suitable data storage device (e.g., a Random Access Memory, a Flash Memory, an Electronically Erasable Programmable Read Only Memory, a Read Only Memory, and/or the like) in electronic communication with the Rx controller 202 for holding (i.e., retrievably storing) a set of unique identifiers (e.g., ID1-IDn). In general, use of a Read Only Memory as the storage memory 204 may, in one or more embodiments, provide a reduction in the cost of manufacturing the associated receiver 102.

The set of unique identifiers generally comprises one or more unique members (i.e., one or more unique identifiers), such as, for example, the identifier ID2. While the unique identifiers have been generally represented in FIG. 2 as ID1-IDn, it should be understood that any appropriate identifier having any appropriate format may be implemented to meet the design criteria of a particular application. In at least one embodiment, the set of unique identifiers is written to (i.e., stored in) the storage memory 204 during the manufacturing process of the receiver 102. Furthermore, in one or more embodiments, the set of unique identifiers may be unmodifiable once the set of unique identifiers is written to the storage memory 204.

Each transmitter 104 is generally electronically coupled to any appropriate sensor 240 for determining the air pressure in a corresponding tire 106. Each transmitter 104 may comprise a controller (i.e., Tx controller) 210, a writable (i.e., programmable) memory 212, and the antenna 214. In at least one embodiment, the transmitter 104 may optionally comprise the low frequency receiver (i.e., LFR) 216 for receiving a signal from the LFI 208.

In general, the Tx controller 210 may be a computer or other electronic component (i.e., logical device) which executes a program and/or which performs other logical exercises, such as an ASIC. It is contemplated that all or part of the functionality of the components represented by the Tx controller 210 may be incorporated into a single controller, such as the Tx controller 210 illustrated in FIG. 2. Alternatively, the components and/or functionality represented by the Tx controller 210 may be distributed among a plurality of controllers (not shown). Controller inputs and outputs may be received and passed between controllers via a network, dedicated communication wires, and the like.

In at least one embodiment, each transmitter 104 may be configured to receive a unique member (i.e., unique identifier) of the set of unique identifiers from the receiver 102, store the unique member in the programmable memory 212, and transmit, to the receiver 102, a signal corresponding to the unique member and the air pressure in the tire.

In at least one embodiment, the transmitter may be configured to receive the unique member of the set of unique identifiers corresponding to the receiver 102 via the low frequency receiver 216. For example, the receiver 102 may be configured to transmit a unique member to the transmitter 104 via the low frequency initiator 208. In another exemplary embodiment, a tool 230 may be electronically coupled (e.g., wired, wirelessly, etc.) to the transmitter 104 for transmitting an operator initiated signal to the transmitter 104. The transmitter 104 may transmit a pairing request signal to the receiver via the antenna 214 in response to the operator initiated signal. In response to the pairing request signal, the receiver 102 may transmit a unique identifier to the low frequency receiver 216 of the transmitter 104 via the low frequency initiator 208 of the receiver 102. In yet another exemplary embodiment, a programming device 232 may be used (e.g., during the manufacture of the transmitter 104) to convey (i.e., transmit, write, etc.) a unique member to the transmitter 104, such as via the LFR 216. In still another embodiment, the transmitter 104 and/or receiver 102 may be a transceiver and the unique member may be conveyed to the transmitter 104 using the antenna 214 and/or the antenna 206. However, a unique member of the set of unique identifiers (e.g., ID1-IDn) corresponding to the receiver 102 may be transmitted to a transmitter 104 in response to any appropriate trigger and using any appropriate communication apparatus to meet the design criteria of a particular application.

In general, the unique member may be stored in the programmable memory 212. Accordingly, the programmable memory 212 is generally configured to receive and retrievably store the unique member during programming (i.e., pairing) of the transmitter 104 and the receiver 102. In at least one embodiment, the programmable memory 212 may be a Random Access Memory (i.e., RAM). In at least one other embodiment, the programmable memory 212 may be a Flash Memory. However, the programmable memory 212 may be any suitable data storage device in electronic communication with the Tx controller 110 for receiving and/or holding (i.e., retrievably storing) an identifier corresponding to the receiver 102.

When the transmitter 104 has been paired with the receiver 102 (i.e., when that transmitter 104 has received and stored the unique member), the transmitter 104 generally uses the antenna 214 to transmit a signal (e.g., a signal PRS) corresponding to the unique member and the air pressure in a corresponding tire 106 to the receiver 102.

In at least one embodiment, the receiver 102 may be configured to receive a signal (e.g., the signal PRS) from a transmitter 104, determine when the signal corresponds to a member of the set of unique identifiers, and process the signal when the signal corresponds to a member of the set of unique identifiers. Similarly, the receiver 102 may be configured to discard the signal when the signal does not correspond to a member of the set of unique identifiers. In one embodiment, the receiver 102 may receive the signal from the transmitter 104 via the antenna 206.

In at least one embodiment, the controller 202 processes the signal by transmitting a display signal corresponding to the air pressure to a display 240 (shown in FIG. 1) in an interior of the vehicle 100. In at least one other embodiment, the controller 202 processes the signal by generating an audible alarm 242 (shown in FIG. 1) and/or a visual alarm 244 (shown in FIG. 1) when the air pressure in the tire 106 is greater than a predetermined maximum threshold or less than a predetermined minimum threshold. However, the controller 202 may perform any appropriate step when the unique member corresponding to the signal matches a member of the set of unique identifiers to meet the design criteria of a particular application.

Figure 3:
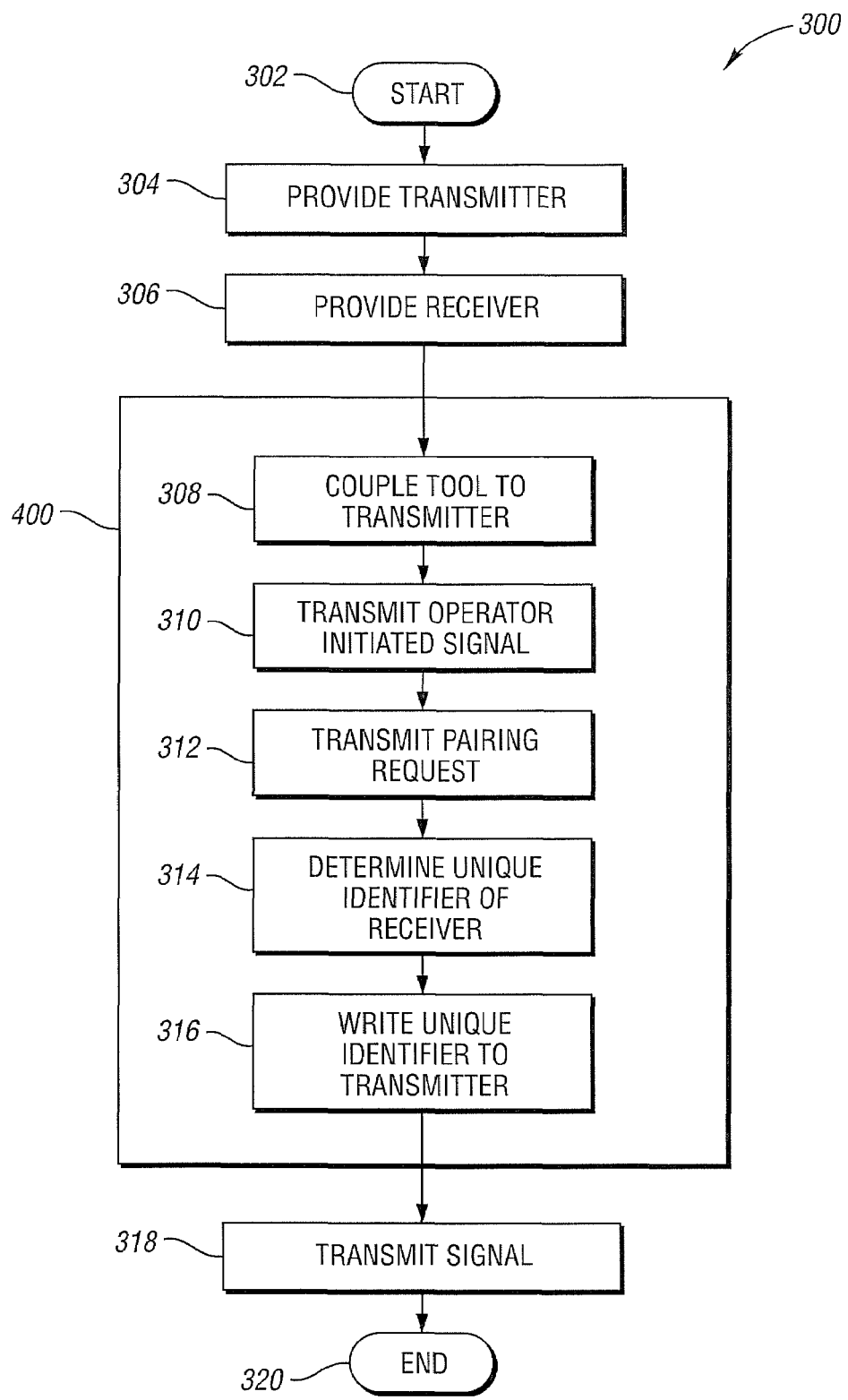
FIG. 3 is a flow diagram of a method for monitoring air pressure in a tire of a vehicle and a flow diagram of a method for pairing a transmitter and a receiver in a system for monitoring air pressure in a tire according to one or more embodiments of the present invention.

Referring to FIG. 3, a flow diagram of a method 300 for monitoring air pressure in a tire (e.g., 106) of a vehicle (e.g., 100) according to one embodiment of the present invention is shown. The method 300 may be advantageously implemented in connection with the system 200, described previously in connection with FIG. 2, and/or any appropriate system to meet the design criteria of a particular application. The method 300 generally includes a plurality of blocks or steps that may be performed serially. As will be appreciated by one of ordinary skill in the art, the order of the steps shown in FIG. 3 is exemplary and the order of one or more steps may be modified within the spirit and scope of the present invention. Additionally, the steps of the method 300 may be performed in at least one non-serial (or non-sequential) order, and one or more steps may be omitted to meet the design criteria of a particular application. Block 302 generally represents an entry point into the method 300.

A transmitter (e.g., 104) may be provided at step 304. In at least one embodiment, the transmitter may include a programmable (i.e., writable) memory (e.g., 212). In general, the transmitter may be configured to identify the air pressure of a tire (e.g., 106). In at least one embodiment, the transmitter may identify the air pressure via a signal generated by a sensor (e.g., 240) electronically coupled to the transmitter. In another embodiment, the transmitter may be integrated with a sensor (i.e., sensing element). However, the transmitter may identify the air pressure using any appropriate technique and/or apparatus to meet the design criteria of a particular application. Similarly, the transmitter may be implemented in any appropriate configuration to meet the design criteria of a particular application.

A receiver (e.g., 102) may be provided at step 306. In general, the receiver may be configured to be coupled to the vehicle (e.g., 100) and generally comprises a memory (e.g., 204) having a set of unique identifiers (e.g., ID1-IDn) stored therein. However, the receiver may be implemented in any appropriate configuration to meet the design criteria of a particular application.

As generally represented by steps 308-312, one or more embodiments of the present invention may optionally include a tool (e.g., 230) electronically (i.e., wired, wirelessly, etc.) coupled to the transmitter. In such an embodiment, an operator initiated signal may be transmitted from the tool to the transmitter, as generally represented by step 310. Furthermore, a pairing request may be transmitted from (i.e., by) the transmitter to the receiver in response to the operator initiated signal, as generally represented by step 312.

At step 314, a unique identifier may be selected (i.e., determined) from the set of unique identifiers stored in the memory of the receiver in response to any appropriate trigger, such as the pairing request signal, and using any appropriate technique and/or apparatus to meet the design criteria of a particular application. In general, the receiver may select the unique identifier from among the members of the set of unique identifiers stored in the memory.

At step 316, the unique identifier may be written to (i.e., stored in) the programmable memory of the transmitter. In one embodiment of the present invention, the transmitter may comprise a low frequency receiver (e.g., 216) and the unique identifier may be written to the programmable memory of the transmitter using a low frequency initiator (e.g., the low frequency initiator 208 of the receiver 102) and the low frequency receiver. In another embodiment of the present invention, the transmitter may comprise an antenna (e.g., 214) and the unique identifier may be written to the programmable memory of the transmitter via unidirectional and/or bi-direction communication between the transmitter antenna and an antenna of a receiver (e.g., 206). In yet another embodiment having the tool of step 308, writing the unique identifier to the programmable memory of the transmitter may further include transmitting the unique identifier to the low frequency receiver of the transmitter (e.g., 216) via a low frequency initiator (such as the low frequency initiator 208 of the receiver 102) in response to pairing request signal. However, the unique identifier of the receiver may be written to the programmable memory of the transmitter in response to any appropriate trigger and using any appropriate technique and/or apparatus to meet the design criteria of a particular application.

At step 318, the transmitter may transmit to the receiver a signal corresponding to the unique identifier and the air pressure in (i.e., of) the tire.

Block 320 generally represents an exit point out of the method 300.

In at least one non-limiting embodiment of the present invention, the step of determining a unique identifier from the set of unique identifiers stored in the memory of the receiver (i.e., step 314) and/or the step of writing the unique identifier to the programmable memory of the transmitter (i.e., step 316) may be performed prior to installation of the receiver in the vehicle. In at least one other non-limiting embodiment, the step of determining a unique identifier from the set of unique identifiers stored in the memory of the receiver (i.e., step 314) and/or the step of writing the unique identifier to the programmable memory of the transmitter (i.e., step 316) may be performed prior to installation of the transmitter in the tire.

Referring still to FIG. 3, a flow diagram of a method 400 for pairing a transmitter (e.g., 104) and a receiver (e.g., 102) in a system (e.g., 200) for monitoring air pressure in a tire (e.g., 106) of a vehicle (e.g., 100) according to one embodiment of the present invention is shown. As illustrated, the method 400 may be a subset of the method 300 and may comprise one or more of the steps 308, 310, 312, 314 and 316. In general, the method 400 may be advantageously implemented in connection with the system 200, described previously in connection with FIG. 2, and/or any appropriate system to meet the design criteria of a particular application. The method 400 generally includes a plurality of blocks or steps that may be performed serially. As will be appreciated by one of ordinary skill in the art, the order of the steps shown in FIG. 3 is exemplary and the order of one or more steps may be modified within the spirit and scope of the present invention. Additionally, the steps of the method 400 may be performed in at least one non-serial (or non-sequential) order, and one or more steps may be omitted to meet the design criteria of a particular application.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for associating a tire pressure sensor positioned within a tire to a vehicle, the system comprising:
  a receiver coupled to the vehicle, the receiver being configured to:
    store a set of unique identifiers that are associated with tires of the vehicle,
    receive a pairing request signal indicative of a request to associate the tire pressure sensor to the receiver, and
    transmit a unique member of the set of unique identifiers that is associated with a first tire of the vehicle in response to the pairing request signal; and
  a transmitter of the tire pressure sensor configured to transmit the pairing request signal and to store the unique member of the set of unique identifiers received from the receiver to associate the tire pressure sensor to the receiver.

2. The system of claim 1 wherein the receiver is configured to receive pressure readings with respect to the first tire from the transmitter in response to the transmitter storing the unique member.

3. The system of claim 1 wherein the transmitter includes programmable memory for storing the unique member of the set of unique identifiers received from the receiver.

4. The system of claim 1 wherein the receiver includes read only memory for storing the set of unique identifiers.

5. The system of claim 1 farther comprising a tool for transmitting an operator initiated signal to the transmitter to cause the transmitter to transmit the pairing request signal.

6. The system of claim 1 wherein the transmitter includes a low frequency receiver and the transmitter is configured to receive the unique member of the set of unique identifiers via the low frequency receiver.

7. The system of claim 1 wherein the receiver further comprises a low frequency initiator for transmitting the unique member of the set of unique identifiers to the transmitter.

8. A method for associating a tire pressure sensor positioned within a tire to a vehicle, the method comprising:
   storing a set of unique identifiers that are indicative of a position of at least one tire of the vehicle in a receiver,
   receiving, at the receiver, a pairing request signal indicative of a request to associate the tire pressure sensor to the receiver, and
   transmitting, from the receiver, a unique member of the set of unique identifiers that is indicative of the position of a first tire of the vehicle in response to the pairing request signal;
   transmitting, from a transmitter of the tire pressure sensor, the pairing request signal; and
   storing the unique member of the set of unique identifiers received from the receiver within the transmitter to associate the tire pressure sensor to the receiver.

9. The method of claim 8 further comprising receiving pressure readings at the receiver with respect to the first tire from the transmitter in response to storing the unique member of the set of unique identifiers.

10. The method of claim 8 wherein storing the unique member of the set of unique identifiers received from the receiver further includes storing the unique member of the set of unique identifiers received from the receiver in programmable memory of the transmitter.

11. The method of claim 8 wherein storing the set of unique identifiers that are indicative of a position of at least one tire in the vehicle in a receiver further includes storing the set of unique identifiers within read only memory of the receiver.

12. The method of claim 8 farther comprising transmitting an operator initiated signal via a tool to the transmitter to cause the transmitter to transmit the pairing request signal.

13. The method of claim 8 further comprising receiving the unique member of the set of unique identifiers via a low frequency receiver in the transmitter.

14. The method of claim 8 wherein transmitting, from the receiver, the unique member of the set of unique identifiers further includes transmitting the unique member of the set of unique identifiers from a low frequency initiator of the receiver to the transmitter.

15. A method for associating a tire pressure sensor positioned within a tire to a vehicle, the method comprising:
   storing a set of unique identifiers that are associated with tires of the vehicle in a receiver,
   transmitting a control signal indicative of a request to associate the tire pressure sensor to the receiver with a programmable device;
   transmitting, from the receiver, a unique member of the set of unique identifiers that is associated with a first tire of the vehicle in response to the control signal; and
   storing the unique member of the set of unique identifiers received from the receiver within the transmitter to associate the tire pressure sensor to the receiver.

16. The method of claim 15 wherein transmitting the control signal indicative of a request to associate the tire pressure sensor to the receiver with the programmable device further includes transmitting the control signal indicative of a request to associate the tire pressure sensor to the receiver with the programmable device prior to installing the receiver to the vehicle.

17. The method of claim 15 further comprising receiving pressure readings at the receiver with respect to the first tire from the transmitter in response to storing the unique member of the set of unique identifiers.

18. The method of claim 15 wherein storing the unique member of the set of unique identifiers received from the receiver within the transmitter further includes storing the unique member of the set of unique identifiers received from the receiver in programmable memory of the transmitter.

19. The method of claim 15 wherein storing the set of unique identifiers that are associated with tires of the vehicle in a receiver further includes storing the set of unique identifiers within read only memory of the receiver.

20. The method of claim 15 wherein transmitting, from the receiver, the unique member of the set of unique identifiers further includes transmitting the unique member of the set of unique set of identifiers from a low frequency initiator of the receiver to the transmitter.

* * * * *

UNITED STATES PATENT AND TRADEMARK OFFICE
CERTIFICATE OF CORRECTION

| | | |
|---|---|---|
| PATENT NO. | : 7,528,706 B2 | Page 1 of 1 |
| APPLICATION NO. | : 11/458212 | |
| DATED | : May 5, 2009 | |
| INVENTOR(S) | : Riad Ghabra et al. | |

It is certified that error appears in the above-identified patent and that said Letters Patent is hereby corrected as shown below:

Column 7, Line 6, Claim 5:

Delete "farther" and insert -- further --.

Column 7, Line 46, Claim 12:

Delete "farther" and insert -- further --.

Signed and Sealed this

Twenty-eighth Day of July, 2009

JOHN DOLL
*Acting Director of the United States Patent and Trademark Office*